(No Model.) 2 Sheets—Sheet 1.
W. BURNLEY.
TELEPHONE TRANSMITTER.
No. 335,502. Patented Feb. 2, 1886.
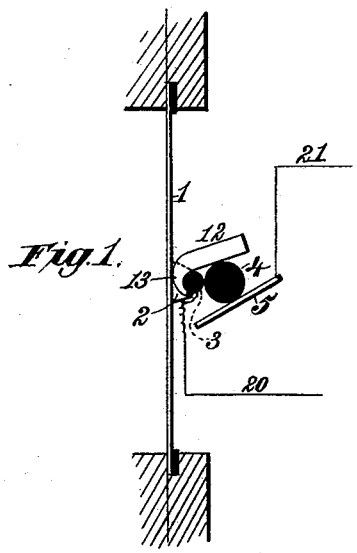
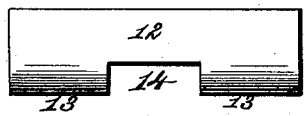
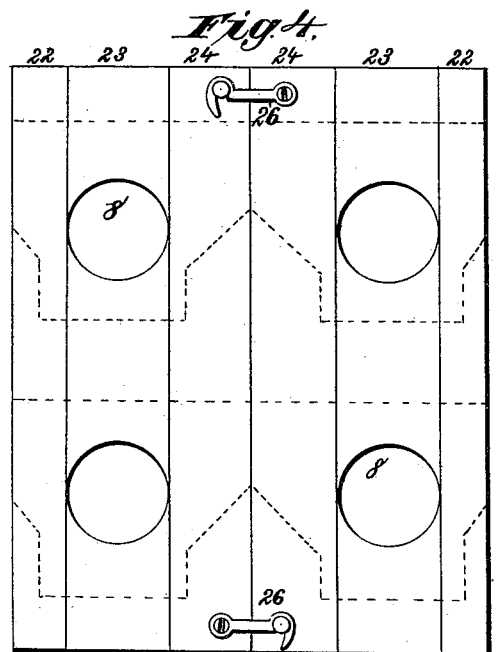
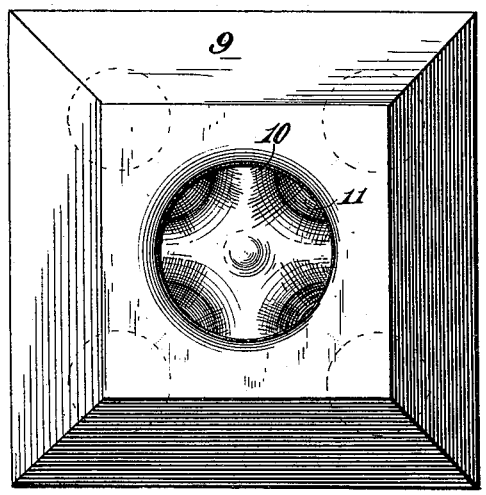
Witnesses.
Robert Errett,
J. A. Rutherford
Inventor:
William Burnley.
By James L. Norris,
Atty.

(No Model.) 2 Sheets—Sheet 2.
W. BURNLEY.
TELEPHONE TRANSMITTER.
No. 335,502. Patented Feb. 2, 1886.
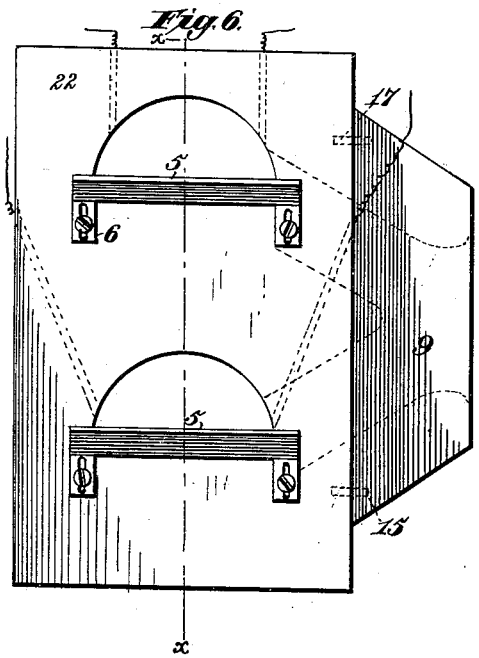
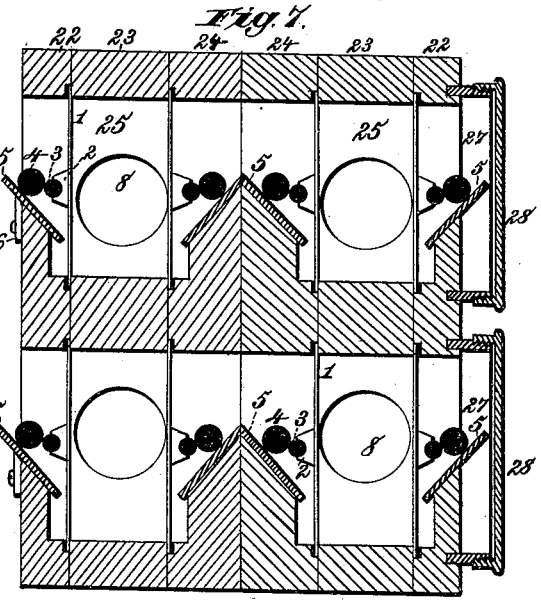
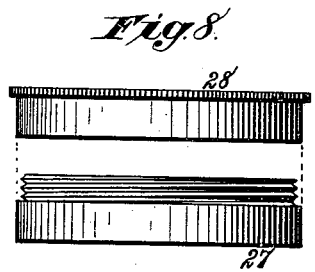
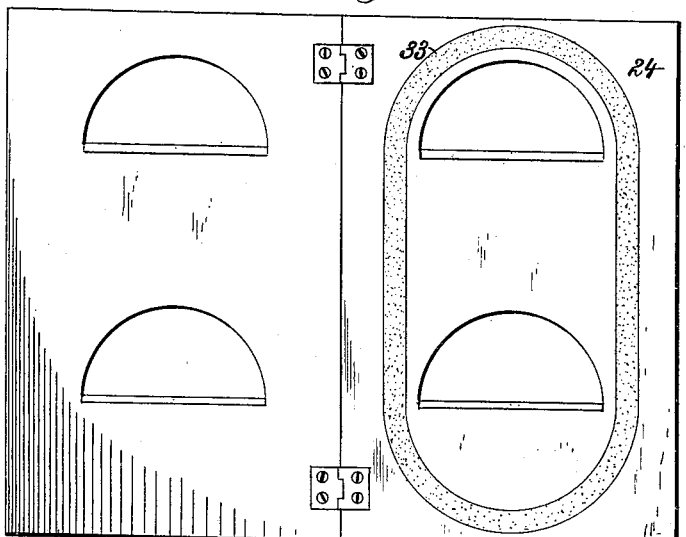
Witnesses.
Robert Everett.
J. A. Rutherford.
Inventor.
William Burnley.
By James L. Norris.
Atty.

UNITED STATES PATENT OFFICE.

WILLIAM BURNLEY, OF NORTH EAST, PENNSYLVANIA, ASSIGNOR OF TWO-THIRDS TO CHARLES A. HITCHCOCK, OF SAME PLACE, AND LEWIS F. WATSON, OF WARREN, PENNSYLVANIA.

TELEPHONE-TRANSMITTER.

SPECIFICATION forming part of Letters Patent No. 335,502, dated February 2, 1886.

Application filed April 11, 1885. Serial No. 161,921. (No model.)

*To all whom it may concern:*

Be it known that I, WILLIAM BURNLEY, a citizen of the United States, residing at North East, Erie county, Pennsylvania, have invented new and useful Improvements in Telephonic Transmitters, of which the following is a specification.

In telephonic transmitters as usually constructed the diaphragm is combined with two electrodes and proper circuit and line connections, so as to control through the medium of the electrodes the current traversing the line. Multiple transmitters have also been constructed in which a series of sets of electrodes were controlled by a single diaphragm, the several sets of electrodes being insulated from each other and connected up in independent local circuits, which they controlled, and which were the primary circuits of induction-coils, the secondary circuits whereof were connected to one main line, either in series or in multiple arc, the object being to throw a greater amount of properly-varied current upon the line, to the end that the line might be lengthened and telephonic transmission effected over an increased distance. The weighting down of a single diaphragm, however, by a number of electrodes I have found tends to render the diaphragm sluggish, and to require an increased volume of powerful sound-waves to make it respond quickly and perfectly. In addition, the exact adjustment of a whole series relatively to one diaphragm is a matter of difficulty and delicacy.

The object of my invention, therefore, is to construct a multiple transmitter in which a series of diaphragms, each controlling an independent set of electrodes, shall be used, and in such manner that all the diaphragms are actuated by the same sound-vibrations. Each set of electrodes has its own circuit and battery connections, which may be the primary circuits of independent induction-coils, whose secondary circuits are connected, either in series or in multiple circuits, to a main line; or all the sets of electrodes may control local-circuit connections to a single primary coil of an induction-coil whose secondary coil is connected to line.

To these ends the invention consists in the features more particularly hereinafter described and claimed, reference being had to the drawings, in which—

Figure 1 is a side view of a single diaphragm and its electrodes; Figs. 2 and 3, a top and end view, respectively, of a detail thereof; Fig. 4, a plan view of the front of the multiple transmitter; Fig. 5, a front view of the mouth-piece thereof; Fig. 6, a side view of the multiple transmitter; Fig. 7, a section thereof on line $x\ x$ of Fig. 6. Fig. 8 is a side view of a dust-protector for the diaphragms and electrodes. Fig. 9 is a longitudinal section of an electrode. Fig. 10 is a plan view of an electrode and the plate on which it rests. Fig. 11 is a view showing a multiple telephone case opened.

The general plan of each diaphragm and its controlled set of electrodes is such that an electrode formed of a carbon pencil or rod is attached by an intermediate rubber block to the diaphragm, while the other electrode, also a carbon pencil, lies loosely upon an inclined metallic plate, the normal contact between the two being due to the gravity of the latter electrode, the contact being aided by a weight or ballast attached to an electrode or lying upon both. This is shown in Figs. 1, 2, and 3, in which the reference-numeral 1 indicates a diaphragm, to which is attached, by means of the rubber block 2, the pencil or rod electrode 3. 5 is an inclined plate, upon which rests the pencil or rod electrode 4, contacting with 1 by its gravity. A weight or ballast, 12, preferably of rubber, lies upon the two electrodes, and aids in normally maintaining good contact between them. This weight or ballast 12 has a central recess, 14, to pass around the block 2 without interference therewith, while on the other side of the recess its body is tapered and bent downward, forming the hooked part 13, by which it catches upon the electrode 1 and is kept in position.

The plate 5 may be provided with legs 6, by which it may be attached to a suitable base or support, as shown in part of Fig. 7, though these may be dispensed with, as shown in another part of the same figure. Suitable circuit-connections are made to the electrodes by a wire, 21, connected to the plate 5, and a wire, 20, connected to the electrode 1. I propose to use a number of such diaphragms and sets of electrodes in a single transmitter, arranging them so that all are equally under the influence of the same sound-waves. In the illustrations here given and herein to be described, eight such diaphragms and sets of electrodes are shown; but I am not confined to such number, as any desired number may be used, the number eight being here used arbitrarily for sake of illustration only.

For ease of construction and mounting, each pair or set of diaphragms is mounted in a base consisting of three sections—an outer one, 22, a middle one, 23, and an outer one, 24. Through 23 are made one or more apertures, 25, slightly smaller than the diaphragms, upon each side of which a diaphragm, 1, is secured. A recess of the same size is sunk to a slight distance in 22 and 24, while an opening is cut entirely through them above the center of the diaphragms, the openings having inwardly-inclined bottoms for supporting the plates 5, as clearly shown in Fig. 7. The result is, that a number of air or wave chambers are formed of the apertures 25, each having a diaphragm on the sides thereof. In Figs. 4 and 7 two such sound-chambers are shown in each half, and if the two halves be united by hinges and secured together by hooks 26, the organization has four sound-chambers and eight independent diaphragms and sets of electrodes. In order to conduct the sound-vibrations equally to all these chambers, air-passages 8 are made therefrom, which are inclined as shown in dotted lines in Fig. 6. A mouthpiece, 9, is used, having the orifice 10 for the mouth, from whence lead inclined passages 11, the passages 11 and 8 being so arranged that when the mouth-piece 9 is secured to the front by pins 17 taking into apertures 15, 11 and 8 register, and each two form one complete passage from 10 to a chamber, 25. Each set of electrodes has its circuit and battery connections 20 21, which may be the primary circuits of independent induction-coils, whose secondary circuits are connected, either in series or in multiple circuits, to a main line; or all the sets of electrodes may control local-circuit connections to the single primary coil of an induction-coil whose secondary coil or coils are connected to the line. I prefer, however, to use therewith an induction-coil having a number of independent primary coils, one for each set of electrodes, upon the same core and a single secondary coil connected to the line. This is not shown in this case, however, as it will form the subject-matter of a separate application. Thus all the diaphragms and sets of electrodes are placed equally under the influence of the same sound-vibrations, and a multiple transmitter is formed of great power, readily operated, yet adapted to throw upon a line a great quantity of largely-varied current, whereby the distance it may be used for transmission is greatly increased. When it is only desired to use two diaphragms and their sets of electrodes, the mouth-piece 9, with passages 11, may be dispensed with, and a plain or ordinary mouth-piece opening directly into the chamber 25 be used.

The construction as thus far described is of the simplest form, and there may arise therein certain dangers which it is best to guard against, as hereinafter noted. As the electrodes are carbon rods or pencils contacting along an axial line upon their circumferences, it is essential that their axes be maintained parallel. Some irregularity or protuberance, scarcely if at all visible to the eye or discoverable, may prevent this parallelism, the cause being in either electrode or in the plate, and being more serious when occurring near the center of gravity of the loose electrode. One method of obviating this is shown in Fig. 9, wherein the loose electrode 4 is slightly, for about the space of one-fourth to one-half an inch, hollowed at its center, while upon each end, beyond this hollowed portion, may be placed platinum bands 30. Instead of the electrode being thus hollowed, a slot may be cut in the plate 5, leaving it a frame upon which the electrode 4 rests at or near its ends. Another plan is shown in Fig. 10, wherein the plate 5 is provided with slightly-raised tracks or ways 32, preferably of a platinum strip or wire soldered to the plate, while the electrode 4 has grooves 31 cut around it, which take up on 32. This slightly raises 4 from 5, and prevents also any endwise motion of 4 upon 5, the electrical connection between the two being preserved by the platinum.

It is a fact that the dust which is constantly floating in the air will, if permitted access to and deposition upon the electrodes, soon lessen and ultimately destroy their usefulness for controlling and varying the circuit. In order then to protect the electrodes when they otherwise would be exposed to this danger, a device like that shown in Fig. 8 is used. 27 is a screw-threaded base, which is secured to the side or base supporting the electrodes by being glued or fastened thereto, or by taking into a recess cut therein for its reception, as shown upon the right-hand side of Fig. 7. Upon this screws the cap 28, the whole forming a dust-proof cap or protector for the electrode where applied. In order to more thoroughly guard the interior of the case against access of dust, a packing-strip of felt, rubber, or cloth, 33, may be applied to one of the sections, as section 35 in Fig. 11. When the two sections are closed together, as in Fig. 4, the compression of this packing between the sections serves to make a dust-proof joint and effectually protect the interior of the case.

Having thus described my invention, what I claim is—

1. In a telephonic transmitter, the combination of a diaphragm, a carbon rod secured thereto by a rubber block, an inclined metallic plate, a loose carbon rod lying thereon and normally contacting with the first-mentioned rod, a weight or ballast of rubber for lying upon these rod-electrodes, and formed with a hook, whereby it is attached to one of the electrodes, substantially as described.

2. In a telephonic transmitter, the combination of the section 23, having the sound-chamber 25 formed therein, the sections 22 and 24, carrying the plates 5, supporting the electrodes 4, two diaphragms secured upon opposite sides of the chamber, and circuit connections, substantially as described.

3. In a telephonic transmitter, the combination of a diaphragm, a carbon-rod electrode secured thereto, a plate, 5, having lugs or arms 6 for its attachment to a supporting-base, and a rod-electrode, 4, lying thereon, substantially as described.

4. In a telephonic transmitter, the combination of a diaphragm, a carbon-rod electrode secured thereto, a loose rod-electrode, the two lying parallel, an inclined plate supporting the loose electrode, and a platinum connection between the plate and loose electrode, substantially as described.

In testimony whereof I affix my signature in presence of two witnesses.

WILLIAM BURNLEY.

Witnesses:
DYER LOOMIS,
E. C. HITCHCOCK.